(12) United States Patent
Jones et al.

(10) Patent No.: US 7,721,717 B2
(45) Date of Patent: May 25, 2010

(54) DIESEL FUEL FILTER

(75) Inventors: William Jones, Hockley (GB); Anthony D. Edwards, Earls Colne (GB)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 11/276,254

(22) Filed: Feb. 21, 2006

(65) Prior Publication Data

US 2006/0157393 A1 Jul. 20, 2006

(30) Foreign Application Priority Data

Jan. 18, 2005 (GB) .................................. 0500959.2

(51) Int. Cl.
*F02M 37/00* (2006.01)
(52) U.S. Cl. ..................................................... 123/510
(58) Field of Classification Search ................. 210/314, 210/335, 440, 443; 123/549, 556, 557, 281, 123/283, 412, 402, 514; 219/206, 207; 261/142; 392/502; F02M 37/00
See application file for complete search history.

(56) References Cited

U.S. PATENT DOCUMENTS

| | | | |
|---|---|---|---|
| 4,177,778 A * | 12/1979 | Naitou et al. ............... | 123/549 |
| 4,600,825 A * | 7/1986 | Blazejovsky ................ | 219/205 |
| 4,806,204 A | 2/1989 | Manfre et al. | |
| 4,861,966 A * | 8/1989 | Matthiesen et al. ......... | 219/205 |
| 5,649,514 A * | 7/1997 | Okada et al. ................ | 123/514 |
| 5,766,468 A * | 6/1998 | Brown et al. ............. | 210/323.2 |
| 6,171,492 B1 * | 1/2001 | Hedgepeth et al. .......... | 210/243 |
| 6,453,870 B1 * | 9/2002 | Koller et al. ............. | 123/198 E |
| 6,868,838 B2 * | 3/2005 | Piet ............................. | 123/541 |

FOREIGN PATENT DOCUMENTS

| | | |
|---|---|---|
| DE | 3538282 | 3/1989 |
| DE | 3624276 | 3/1992 |
| GB | 1568503 | 5/1980 |
| GB | 2099321 | 12/1982 |

* cited by examiner

*Primary Examiner*—Stephen K Cronin
*Assistant Examiner*—Keith Coleman
(74) *Attorney, Agent, or Firm*—Julia Voutyras; Brooks Kushman P.C.

(57) ABSTRACT

A diesel fuel filter has a filter element which incorporates or is constituted by a heater made of an electrically conductive fabric which heats at least the inlet side surface of the filter element. A filter element formed entirely from the electrically conductive fabric can be used to protect a lift pump 12 while a filter element made of layers of fine mesh filter material and an electrically conductive material of coarser mesh is better suited for the primary fuel filter 16 located upstream of the fuel injection pump 18.

17 Claims, 2 Drawing Sheets

DIESEL FUEL FILTER

FIELD OF THE INVENTION

The present invention relates to diesel fuel filters that may be used upstream of a fuel injection pump or a lift pump.

BACKGROUND OF THE INVENTION

In diesel engine fuel systems, it has long been necessary to filter fuel to very fine levels prior to admission to the fuel injection pump. With the introduction in recent years of higher pressure systems (e.g. the High Pressure Common Rail or HPCR systems) much finer fuel pump and injector clearances have been developed in order to achieve the very high fuel pressures required. This puts even more emphasis on finer filtration of the fuel, normally to micron contaminant levels, before it is admitted to the fuel injection pump.

One of the known difficulties associated with the filtration of diesel fuel is associated with the fuel's natural tendency to nucleate wax crystals as the ambient temperature is reduced. This may be of little concern to the engine or vehicle operator until a certain temperature is reached. At this temperature, the volume of crystallized wax in the fuel may be enough to effectively block the fuel filter as if it were solid debris, thus rendering the engine inoperative. This temperature may be established for different fuels by a standard test and is called the Cold (Fuel) Filter Plugging Point or CFPP. Modern fuels, such as those formulated for use in northern Europe and Scandinavia, contain chemical additives that help the fuel to stay fluid down to low temperatures during the winter months (e.g. −34° C. in Finland and −15° C. in the UK). Other parts of the world are often not so well served and engine operation at low temperature may become affected by pressure drops in the fuel system caused by waxing.

Hitherto, it has been proposed to heat critical parts of the system, such as the housing of the filter element and fuel lines to enable an engine to start at low temperatures. Conventional heated diesel fuel filters are found to have either nickel chromium resistance wire heaters or PTC heaters (high power ceramic heaters with a positive temperature coefficient of resistance) built into the housing of the fuel filter. Such an arrangement is disclosed in EP-A-0 400 223.

SUMMARY OF THE INVENTION

The present invention seeks to provide a more effective and more energy efficient manner or avoiding blockage of the diesel fuel filter element at low temperatures.

According to the present invention, there is provided a diesel fuel filter having a filter element, in which means are provided for directly heating electrically at least the surface of the filter element through which fuel enters the element during use.

In the prior art, the entire mass of fuel in the fuel lines or in the housing containing the filter element needed to be heated to a temperature sufficiently high, i.e. above the CFPP temperature, to prevent the nucleation of wax crystals. By contrast, the invention concentrates the heat at the surface where blockage occurs, i.e. at the surface of the filter element itself. Wax crystals can be prevented in this way from adhering to the filter element and the fuel passing through the filter element can be heated sufficiently to ensure that no wax crystals nucleate downstream of the filter element.

In one embodiment of the invention, the filter element is itself made entirely of an electrically conductive fabric.

Certain processed polymeric materials have been found to become conductive and possess positive temperature coefficient behaviour when an electrical potential is applied to them. One such material, manufactured in the UK, is marketed under the name of Gorix®. The material is believed to be made from a polymeric fiber that is baked at 1000° C. It can subsequently be woven and baked a second time to form an electrically conductive fabric. The electrically conductive fabric can be laminated or encapsulated within other materials to form a heater that can be energised by a low voltage power source.

The invention is not however restricted to the use of Gorix® and can be implemented using any form of electrically conductive porous sheet material that will act as a heater.

It is believed that using existing electrically conductive fabrics, a filter element can currently be made with a mesh size sufficiently small to prevent the passage of the relatively large particles to be found in diesel fuel, making such a filter element suitable for use upstream of a lift pump to block particles that would cause damage and wear to the lift pump. It is not however believed that electrically conductive fabrics can yet be made with a mesh size sufficiently small to block the smaller particles that have to be prevented from entering the fuel injection pump.

In a second embodiment of the invention, the filter element comprises a filter fabric of small mesh size of which at least the surface through which fuel enters the element is heated by means of a separate electrically conductive fabric in thermal contact with the latter surface.

Advantageously, the filter element may be formed of several alternating layers of fine mesh fabric and electrically conductive fabric.

Such a filter element may for example be formed by winding two web around a common former, the first web being of a fine mesh fabric and the second of an electrically conductive fabric.

The use of an electrically conductive fabric as a means of directly heating a diesel filter element offers several advantages over the prior art. In particular, the heat distribution is even instead of the heat being concentrated at a location remote surface on which the wax crystals settle. Furthermore, the resulting heated filter element is robust because the material is pliable and resistant to corrosion. A further advantage stems from the fact that wire connectors can be obviated, eliminating the risk of their breakage. Last, the fuel heater is replaced at the same time as the filter thereby avoiding the need for separate maintenance.

BRIEF DESCRIPTION OF THE DRAWINGS

The invention will now be described further, by way of example, with reference to the accompanying drawings, in which.

DETAILED DESCRIPTION OF THE INVENTION

Figure 1:
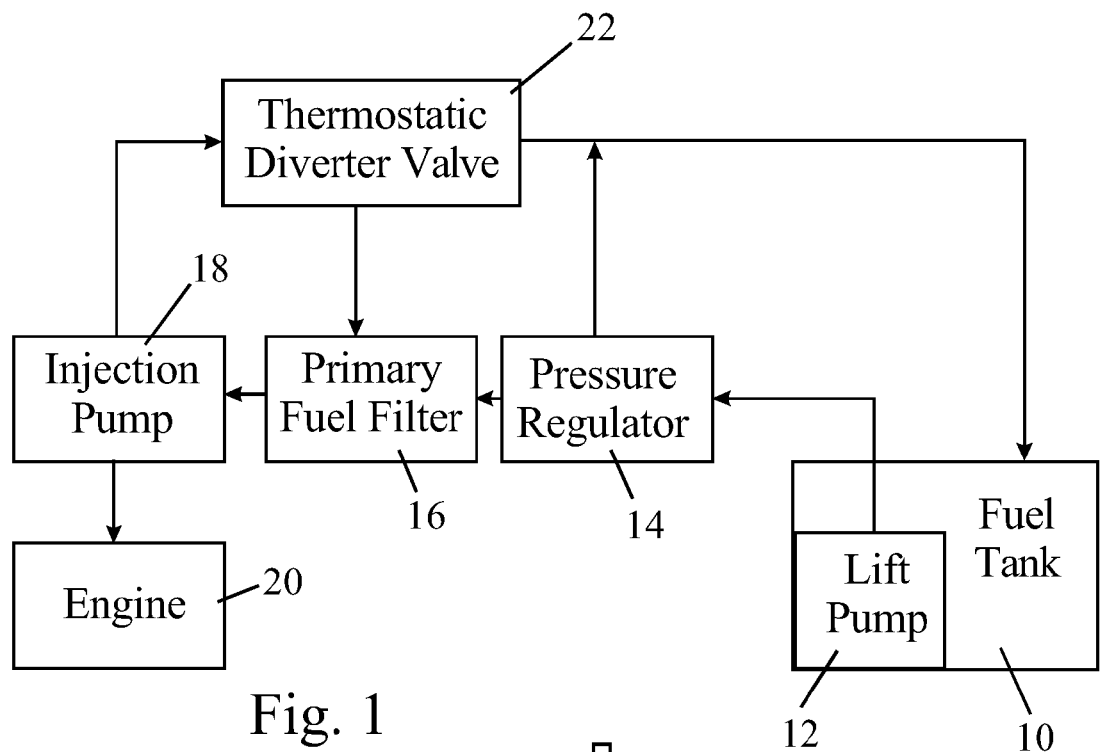
FIG. 1 is a diagram of the fuel supply circuit of a diesel engine.

Referring first to FIG. 1, diesel from a fuel tank 10 is delivered by means of a lift pump 12 to a pressure regulator 14. From the pressure regulator 14, the fuel flows via a primary fuel filter 16 to a fuel injection pump. The purpose of the regulator 14 is to ensure that the lift pump 12 is not damaged in the event of a blockage of the primary filter 16 in which event the fuel pumped by the lift pump 12 is returned to the fuel tank 10.

The lift pump 12 delivers fuel to the injection pump 18 at a greater rate than fuel is injected into the cylinders of the engine 20. The surplus fuel pressurized by the injection pump 18 is recycled to the primary fuel filter 16 by way of a thermostatic diverter valve 22. As fuel is pumped round the closed loop consisting of the injection pump 18, the thermostatic diverter valve 22 and the filter 16, its temperature rises and when it exceeds a certain value the valve 22 diverts the fuel instead back to the fuel tank 10.

The above circuit is entirely conventional and is described only for the purpose of providing a better understanding of the background to the present invention.

It can be seen from the above description that a diesel engine has two fuel pumps, a low pressure lift pump 12 and a high pressure injection pump 18. The lift pump 12 is less sensitive to the presence of particles in the fuel and a fairly course filter will suffice to prevent wear in the pump 12.

However, even such a coarse filter can become blocked at low temperatures if wax crystals are allowed to build up on its surface.

Figure 2:
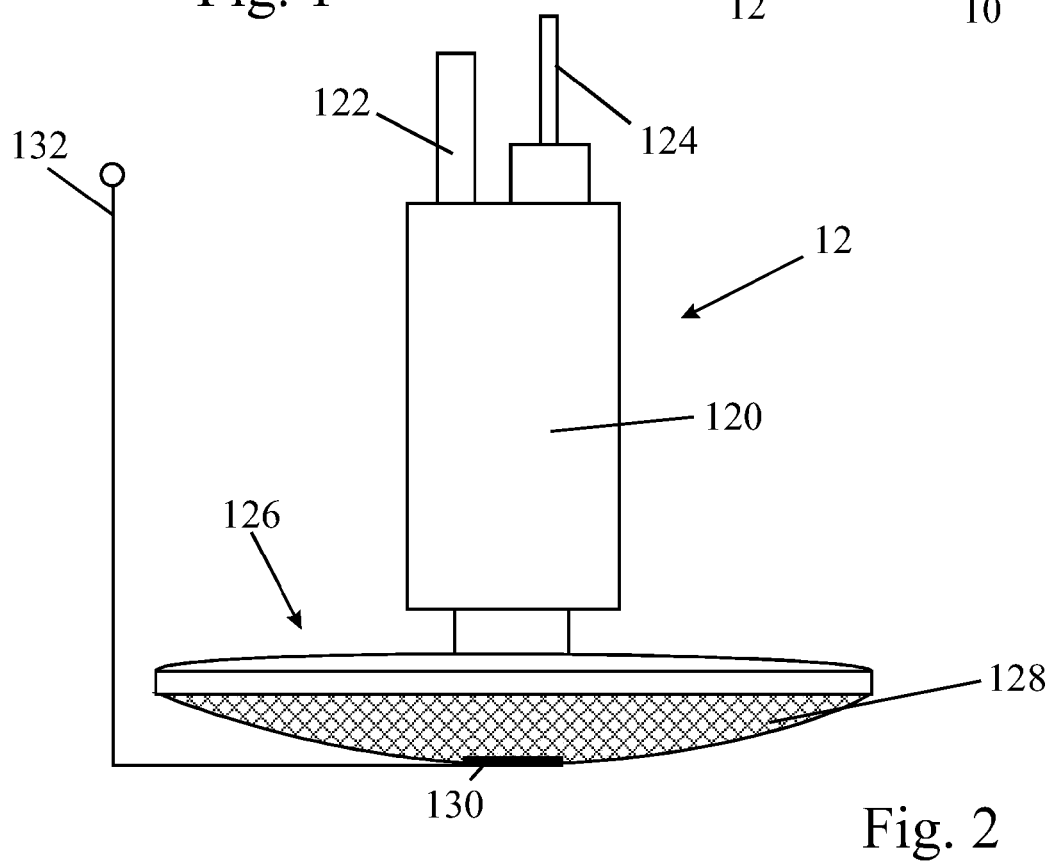
FIG. 2 is a schematic representation of a lift pump.

A lift pump that mitigates this problem is shown in FIG. 2. The lift pump 12 has a conventional pump body 120 with an electrical supply cable 122 and an outlet fuel connector 124. The inlet to the pump 12 is arranged at the bottom of the pump body 120 and is protected by a filter housing 126 having a filter element 128.

The filter element 128 is formed entirely of an electrically conducting fabric having a positive temperature coefficient of resistance, a suitable fabric being Gorix®. A filter element 128 made entirely of such an electrically conductive fabric can block any particles large enough to interfere with the operation of the lift pump 12. In addition, the filter element 128 is itself a heater as it can conduct a heating current and furthermore the maximum temperature of the filter element will be self regulating on account of the positive temperature coefficient of resistance.

To enable a current to be passed through the filter element 128, it is provided in the illustrated embodiment with a central electrode 130 connected to a supply lead 132 while its periphery is connected to ground through the main body 120 of the pump. Of course, various other configurations can alternatively be used for positioning electrodes on filter element 128, so that instead of flowing radially the current may flow from one side of the element to the other.

Though a filter element made entirely of Gorix® may currently have a mesh size adequate for use with a lift pump, it is not suitable for use in the primary fuel filter 16 which, because of the fine tolerances used in the injection pump 18, must be capable of blocking much smaller particles.

Figure 3:
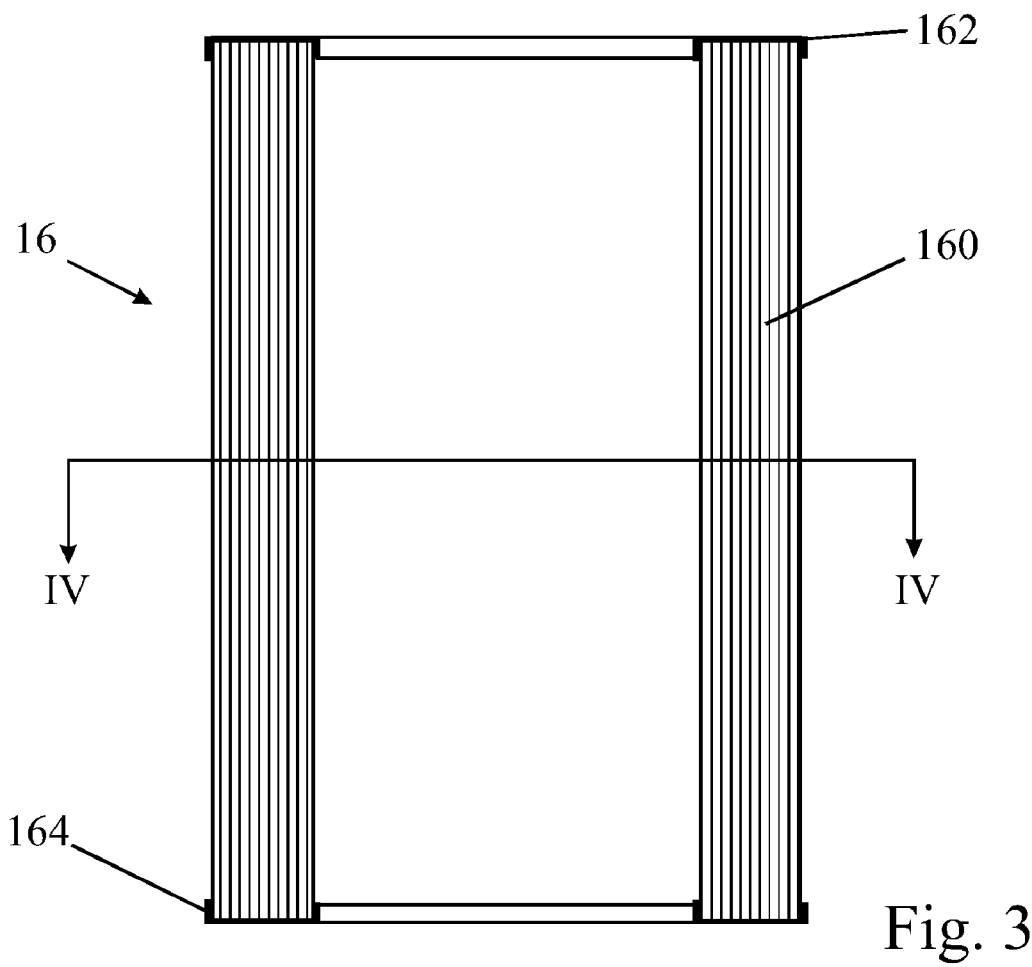
FIG. 3 is a schematic axial section through a fuel filter element.
Figure 4:
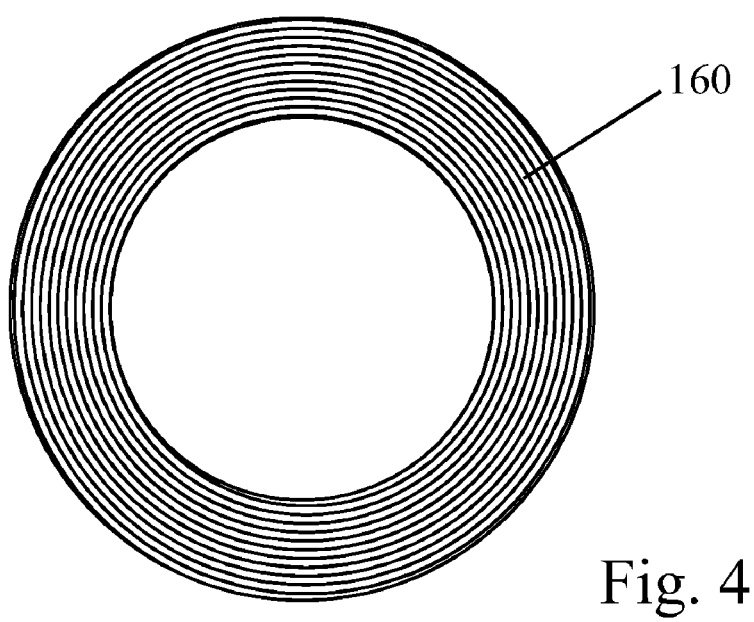
FIG. 4 is a section on the line IV-IV in FIG. 3.

In the filter element 16 shown in FIGS. 3 and 4, this problem is overcome by winding two webs of fabric about a common former, to produce the cylindrical core 160 of the filter element 16. The first fabric has a fine mesh and may be formed of any suitable filter material, such a paper. The second fabric on the other hand is electrically conductive but has a larger mesh size. Two metal end rings 162 and 164 are crimped onto the axial ends of the core 160 and these can act as electrodes to pass current in an axial direction through the conductive fabric of the filter element 16.

In use, the filter element 16 is retained in a housing with a fuel inlet and a fuel outlet positioned such that the fuel has to flow radially through the core 160 of the filter element when passing from the inlet to the outlet. In the illustrated embodiment, the core 160 is heated throughout the thickness of the core but it is only necessary to heat the surface of the core through which fuel enters the core.

It will once again be clear to the person skilled in the art that the configuration electrodes contacting the electrically conductive fabric may be different from that illustrated. For example, the end rings may be made of an insulating material with two annular electrically conductive inserts so that the current through the electrically conductive pass will flow tangentially rather than radially.

It will also be clear that the core 160 may be formed by a fanfold of filter material rather than a spiral, the design of the element and the core not being of fundamental importance to the invention. The invention requires only that the surface of the inlet side of the core should be electrically heated by a surface heater incorporated into the core.

We claim:

1. A method for heating a fuel filter, comprising:
   supplying an electric potential to a fuel filter element coupled to a fuel lift pump wherein the filter element is formed entirely of an electrically-conductive fabric comprised of polymeric fibers and said electrically-conductive fabric has a positive temperature coefficient.

2. The method of claim 1, wherein said fuel pump is mounted within a fuel tank.

3. The method of claim 1, wherein said electric potential is supplied via an electrical supply cable coupled to said fuel lift pump.

4. A diesel fuel filter, comprising:
   a filter element entirely formed from an electrically-conductive polymeric material, said filter element adapted to allow fuel to pass through during use;
   a central electrode coupled to said filter element; and
   a supply lead coupled to said central electrode.

5. The diesel fuel filter of claim 4, wherein said filter element is made of a coarse mesh.

6. The diesel fuel filter of claim 4, wherein a periphery of said filter element is coupled to said fuel pump body which is connected to electrical ground.

7. A diesel fuel filter, comprising:
   a first filter element formed entirely of an electrically-conductive fabric of a polymeric fiber fabric of a coarse mesh; and
   a second filter element formed of a fine mesh, said second filter element being in contact with said first filter element over a majority of one side of said second filter element's surface wherein openings in said coarse mesh are greater than openings in said fine mesh.

8. The diesel fuel filter of claim 7, wherein said electrically-conductive fabric has a positive temperature coefficient of resistance.

9. The diesel fuel filter of claim 7, wherein said first and second filter elements are concentric cylinders, further comprising: a first metal end ring crimped onto a first axial end of said first and second filter elements.

10. The diesel fuel filter of claim 7, further comprising: a second metal end ring crimped onto a second axial end of said first and second filter elements.

11. The diesel fuel filter of claim 7, wherein said first and second filter elements are wound together.

12. The diesel fuel filter of claim 7, wherein said second filter element is comprised of paper.

13. The diesel fuel filter of claim 7, wherein an electric potential is applied across said first filter element when in use.

14. A method of manufacturing a diesel fuel filter, comprising:

providing a section comprised entirely of an electrically-conductive fabric, said fabric comprised of a polymeric material woven into a mesh;

attaching said fabric section to a filter housing, said fabric section attached to the filter housing comprising the entirety of the diesel fuel filter; and coupling an electrode to said fabric section.

15. The method of claim 14, further comprising encapsulating said fabric section in another material.

16. The method of claim 14, wherein said mesh is coarse.

17. The method of claim 1 wherein the electrically-conductive fabric is woven of polymeric fibers.

* * * * *